United States Patent
Tripathi et al.

(10) Patent No.: US 7,627,899 B1
(45) Date of Patent: Dec. 1, 2009

(54) METHOD AND APPARATUS FOR IMPROVING USER EXPERIENCE FOR LEGITIMATE TRAFFIC OF A SERVICE IMPACTED BY DENIAL OF SERVICE ATTACK

(75) Inventors: Sunay Tripathi, San Jose, CA (US); Nicolas G. Droux, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 958 days.

(21) Appl. No.: 11/112,629

(22) Filed: Apr. 22, 2005

(51) Int. Cl.
    *G08B 23/00* (2006.01)
(52) U.S. Cl. ...................................................... 726/25
(58) Field of Classification Search .................... 726/25
    See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,157,955 A * | 12/2000 | Narad et al. | 709/228 |
| 6,163,539 A | 12/2000 | Alexander et al. | |
| 6,167,445 A * | 12/2000 | Gai et al. | 709/223 |
| 6,477,643 B1 | 11/2002 | Vorbach et al. | |
| 6,600,721 B2 | 7/2003 | Edholm | |
| 6,633,835 B1 * | 10/2003 | Moran et al. | 702/190 |
| 6,714,960 B1 | 3/2004 | Bitar et al. | |
| 6,757,731 B1 | 6/2004 | Barnes et al. | |
| 6,829,217 B1 | 12/2004 | Bechtolsheim et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,944,673 B2 * | 9/2005 | Malan et al. | 709/237 |
| 7,002,974 B1 * | 2/2006 | Deerman et al. | 370/401 |
| 7,046,665 B1 | 5/2006 | Walrand et al. | |
| 7,120,122 B1 * | 10/2006 | Starr et al. | 370/250 |
| 7,146,431 B2 | 12/2006 | Hipp et al. | |
| 7,177,311 B1 | 2/2007 | Hussain et al. | |
| 7,257,815 B2 | 8/2007 | Gbadegesin et al. | |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

*Primary Examiner*—Kambiz Zand
*Assistant Examiner*—William S Powers
(74) *Attorney, Agent, or Firm*—Osha + Liang LLP

(57) ABSTRACT

A method for isolating legitimate network traffic during a denial of service attack involves receiving a plurality of packets from a network, detecting an attack from the network on a first virtual network stack, wherein the attack on the first virtual network stack comprises at least one from the group consisting of the denial of service attack and an extreme network load, if the attack is detected, forwarding a plurality of packets associated with a subsequent connection to a temporary data structure associated with a second virtual network stack, wherein the second virtual network stack is a lowest priority queue configured at connection setup time, determining whether the subsequent connection is legitimate, and forwarding at least one of the plurality of packets associated with the subsequent connection to a temporary data structure associated with the first virtual network stack if the subsequent connection is legitimate, wherein a higher priority mapping is assigned by a classifier to the subsequent connection.

24 Claims, 6 Drawing Sheets

U.S. PATENT DOCUMENTS

| | | | |
|---|---|---|---|
| 7,260,102 B2 | 8/2007 | Mehrvar et al. | |
| 7,313,142 B2 | 12/2007 | Matsuo et al. | |
| 7,376,080 B1 * | 5/2008 | Riddle et al. | 370/229 |
| 2001/0052024 A1 * | 12/2001 | Devarakonda et al. | 709/238 |
| 2002/0052972 A1 | 5/2002 | Yim | |
| 2003/0037154 A1 | 2/2003 | Poggio et al. | |
| 2003/0076848 A1 * | 4/2003 | Bremler-Barr et al. | 370/412 |
| 2003/0236999 A1 * | 12/2003 | Brustoloni | 713/201 |
| 2004/0236966 A1 * | 11/2004 | D'Souza et al. | 713/201 |
| 2005/0135243 A1 | 6/2005 | Lee et al. | |
| 2005/0138620 A1 | 6/2005 | Lewites | |
| 2006/0041667 A1 * | 2/2006 | Ahn et al. | 709/229 |
| 2006/0070066 A1 * | 3/2006 | Grobman | 718/1 |
| 2006/0174324 A1 | 8/2006 | Zur et al. | |

* cited by examiner

METHOD AND APPARATUS FOR IMPROVING USER EXPERIENCE FOR LEGITIMATE TRAFFIC OF A SERVICE IMPACTED BY DENIAL OF SERVICE ATTACK

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" U.S. application Ser. No. 11/112,367; "Method and Apparatus for Consolidating Available Computing Resources on Different Computing Devices" U.S. application Ser. No. 11/112,368; "Assigning Higher Priority to Transactions Based on Subscription Level" U.S. application Ser. No. 11/112,947; "Method and Apparatus for Dynamically Isolating Affected Services Under Denial of Service Attack" U.S. application Ser. No. 11/112,158; "Method and Apparatus for Limiting Denial of Service Attack by Limiting Traffic for Hosts" U.S. application Ser. No. 11/112,328; "Hardware-Based Network Interface Per-Ring Resource Accounting" U.S. application Ser. No. 11/112,222; "Dynamic Hardware Classification Engine Updating for a Network Interface" U.S. application Ser. No. 11/112,934; "Network Interface Card Resource Mapping to Virtual Network Interface Cards" U.S. application Ser. No. 11/112,063; "Network Interface Decryption and Classification Technique" U.S. application Ser. No. 11/112,436; "Method and Apparatus for Enforcing Resource Utilization of a Container" U.S. application Ser. No. 11/112,910; "Method and Apparatus for Enforcing Packet Destination Specific Priority Using Threads" U.S. application Ser. No. 11/112,584; "Method and Apparatus for Processing Network Traffic Associated with Specific Protocols" U.S. application Ser. No. 11/112,228; and "Method and Apparatus for Enforcing Bandwidth Utilization of a Virtual Serialization Queue" U.S. application Ser. No. 11/112,322.

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

With the rising popularity of offering critical services (e.g., web services, applications, identity services, mail services, etc.) on the Internet, attacks on the receiving system that offer such critical services have become relatively common. A common attack is a denial of service (DOS) attack where a sending system bombards a receiving system (i.e., host) with a large number of packets causing excessive amounts of endpoint, and possibly transit, network bandwidth (or resources) to be consumed. Such attacks are commonly referred to as packet flooding attacks.

The Internet is entirely composed of limited resources. Such limited resources as bandwidth, processing power, and storage capacities are all common targets for DOS attacks designed to consume enough of a host's available resources to cause some level of service disruption. One reaction to DOS attacks is to overprovision a system to handle excess loads that may be generated by the attack. However, a limit exists to the amount of limited resources that can be allocated to a system, both in terms of availability and cost. Accordingly, most of the service providers with any level of critical services on the Internet deploy various kinds of intrusion detection systems (IDS) to assist in defending against DOS attacks. Ideally, legitimate traffic is capable of being isolated from attacking traffic under a DOS attack. Traditionally, isolating the traffic is done by the host which pays tremendous performance costs for pulling the packet into main memory and processing the packet before discovering whether the packet is legitimate.

Recently, the use of source IP address spoofing during DOS attacks and the advent of distributed attack methods and tools have provided a continuing challenge in the area of DOS attack prevention. For example, consider the scenario where the attacker has a large amount of CPU resources and performs a legitimate operation (like retrieving a home page) again and again, which is often undetectable. The result is an attack with potentially no way to recover.

SUMMARY

In general, in one aspect, the invention relates to a method for isolating legitimate network traffic during a denial of service attack. The method comprises receiving a plurality of packets from a network, detecting an attack from the network on a first virtual network stack, wherein the attack on the first virtual network stack comprises at least one from the group consisting of the denial of service attack and an extreme network load, if the attack is detected, forwarding a plurality of packets associated with a subsequent connection to a temporary data structure associated with a second virtual network stack, wherein the temporary data structure is a lowest priority queue configured at connection setup time, determining whether the subsequent connection is legitimate, and forwarding at least one of the plurality of packets associated with the subsequent connection to a temporary data structure associated with the first virtual network stack if the subsequent connection is legitimate, wherein a higher priority mapping is assigned to the subsequent connection by a classifier.

In general, in one aspect, the invention relates to a method for isolating legitimate network traffic during a denial of service attack. The method comprises receiving a plurality of packets from a network, detecting an attack from the network on a first virtual network stack, wherein the attack on the first virtual network stack comprises at least one from the group consisting of the denial of service attack and an extreme network load, if the attack is detected, forwarding a plurality of packets associated with a subsequent connection to a temporary data structure associated with a second virtual network stack, wherein the temporary data structure is a lowest priority queue configured at connection setup time, determining whether the subsequent connection is legitimate, and forwarding at least one of the plurality of packets associated with the subsequent connection to a temporary data structure associated with the first virtual network stack if the subsequent connection is legitimate, wherein a higher priority mapping is assigned to the subsequent connection by a classifier.

Other aspects of the invention will be apparent from the following description and the appended claims.

DETAILED DESCRIPTION

Figure 1A:
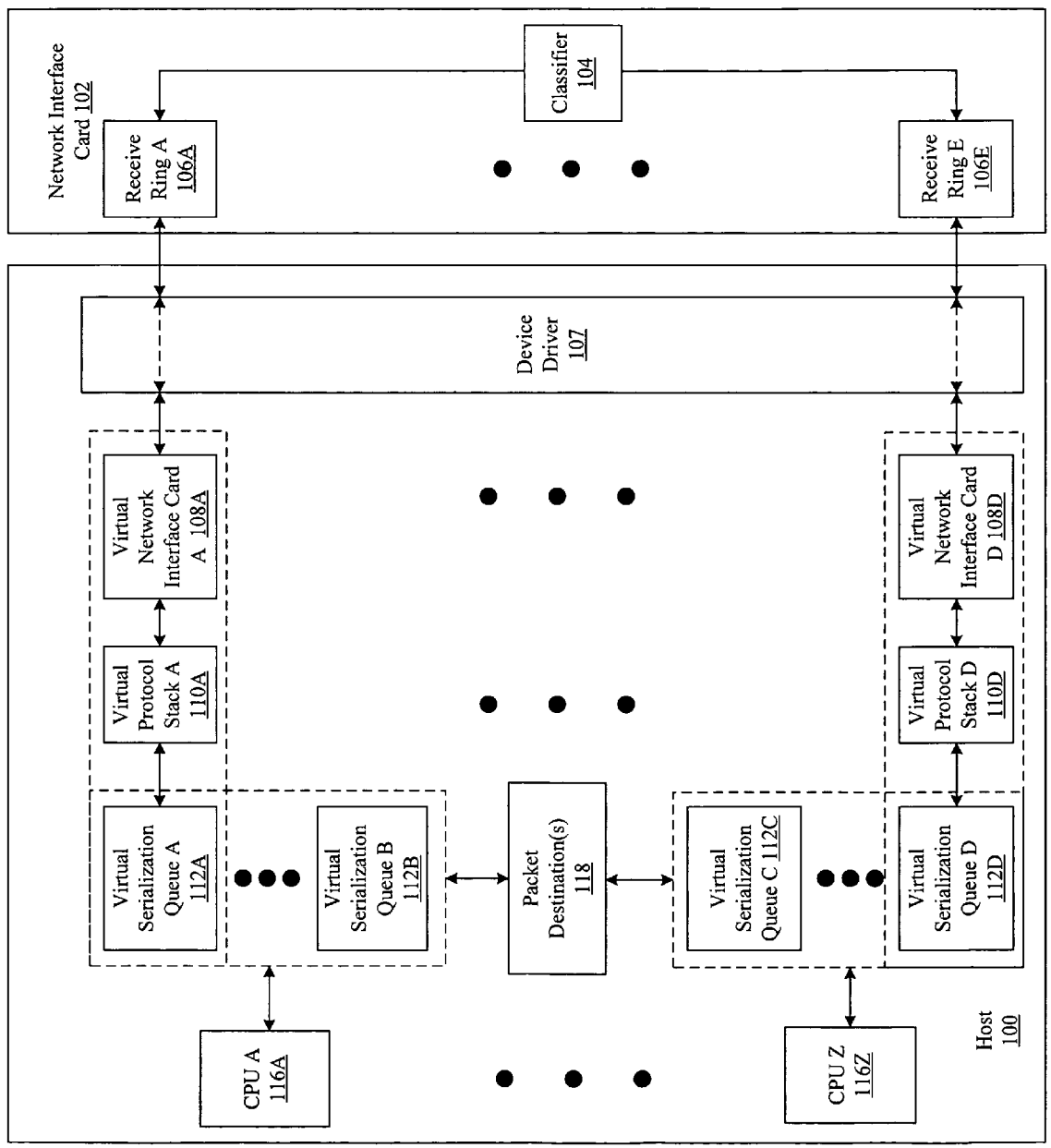
FIGS. 1A and 1B show a system in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for isolating legitimate network traffic during a denial of service attack. More specifically, embodiments of the invention relate to an architecture that allows legitimate network traffic to continue without impact once the authentication is done.

FIG. 1A shows a system in accordance with one embodiment of the invention. As shown in FIG. 1A, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then forwarded to other components on the NIC (102) for processing. In one embodiment of the invention, the NIC (102) includes a classifier (104) and one or more receive rings (106A, 106D). In one embodiment of the invention, the receive rings (106A, 106D) correspond to portions of memory within the NIC (102) used to temporarily store the received packets. Further, in one embodiment of the invention, a ring element of the receive rings (106A, 106D) may point to host memory. In one embodiment of the invention, the classifier (104) is configured to analyze the incoming network traffic, typically in the form of packets, received from the network (not shown). Further, in one embodiment of the invention, the classifier can by dynamically programmed by an IP stack to send packets for any connection to any of these receive resources.

In one embodiment of the invention, analyzing individual packets includes determining to which of the receive rings (106A, 106D) each packet is forwarded. In one embodiment of the invention, analyzing the packets by the classifier (104) includes analyzing one or more fields in each of the packets to determine to which of the receive rings (106A, 106D) the packets are forwarded. As an alternative, the classifier (104) may use the contents of one or more fields in each packet as an index into a data structure that includes information necessary to determine to which receive ring (106A, 106D) that packet is forwarded. In one embodiment of the invention, the classifier (104) is able to arbitrarily move connections to any temporary data structure (i.e., receive ring (106A, 106D)) based on the fields in each packet. In one embodiment of the invention, the classifier (104) is capable of being dynamically programmed to forward packets coming from an identified denial of service attack to a particular temporary data structure, such as receive ring (106A, 106D).

The classifier (104) may be implemented entirely in hardware (i.e., the classifier (104) may be a separate microprocessor embedded on the NIC (102)). Alternatively, the classifier (104) may be implemented in software stored in memory (e.g., firmware, etc.) on the NIC and executed by a microprocessor on the NIC (102).

In one embodiment of the invention, the host (100) may include the following components: a device driver (107), one or more virtual NICs (108A, 108D), one or more virtual protocol stacks (110A, 110D), one or more virtual serialization queues (112A, 112B, 112C, 112D), one or more CPUs (116A, 116Z), and one or more packet destination(s) (118) (e.g., services, containers, etc.).

In one embodiment of the invention, the device driver (107) provides an interface between the receive rings (106A, 106D) and the host (100). More specifically, the device driver (107) exposes the receive rings (106A, 106D) to the host (100). In one embodiment of the invention, each of the virtual NICs (108A, 108D) is associated with one or more receive rings (106A, 106D). The virtual NICs (108A, 108D) provide an abstraction layer between the NIC (102) and the various packet destination (118) executing on the host (100). More specifically, each virtual NIC (108A, 108D) operates like a NIC (100). For example, in one embodiment of the invention, each virtual NIC (108A, 108D) is associated with one or more Internet Protocol (IP) addresses, one or more ports, and configured to handle one or more protocol types of the attacking host. Thus, while the host (100) may be operatively connected to a single NIC (102), a packet destination (118) executing on the host (100)) operate as if the host (100) is bound to multiple NICs.

Each of the virtual NICs (108A, 108D) is operatively connected to a corresponding virtual protocol stack (110A, 110D). In one embodiment of the invention, each virtual protocol stack (110A, 110D) includes functionality to process packets in accordance with various protocols used to send and receive packets (e.g., Transmission Communication Protocol (TCP), Internet Protocol (IP), User Datagram Protocol (UDP), etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from an associated virtual NIC (108A, 108D) via an associated virtual protocol stack (110A, 110D). In addition, each virtual serialization queue (112A, 112B, 112C, 112D) is configured to send and receive packets from one or more associated packet destination (118). The structure of the virtual serialization queue (112A, 112B, 112C, 112D) is discussed below in detail and shown in FIG. 3.

As discussed above, the host (100) may include one or more CPUs (116A, 116Z). Further, each virtual serialization queue (112A, 112B, 112C, 112D) is bound to one of the CPUs (116A, 116Z). As shown in FIG. 1A, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

Figure 1B:
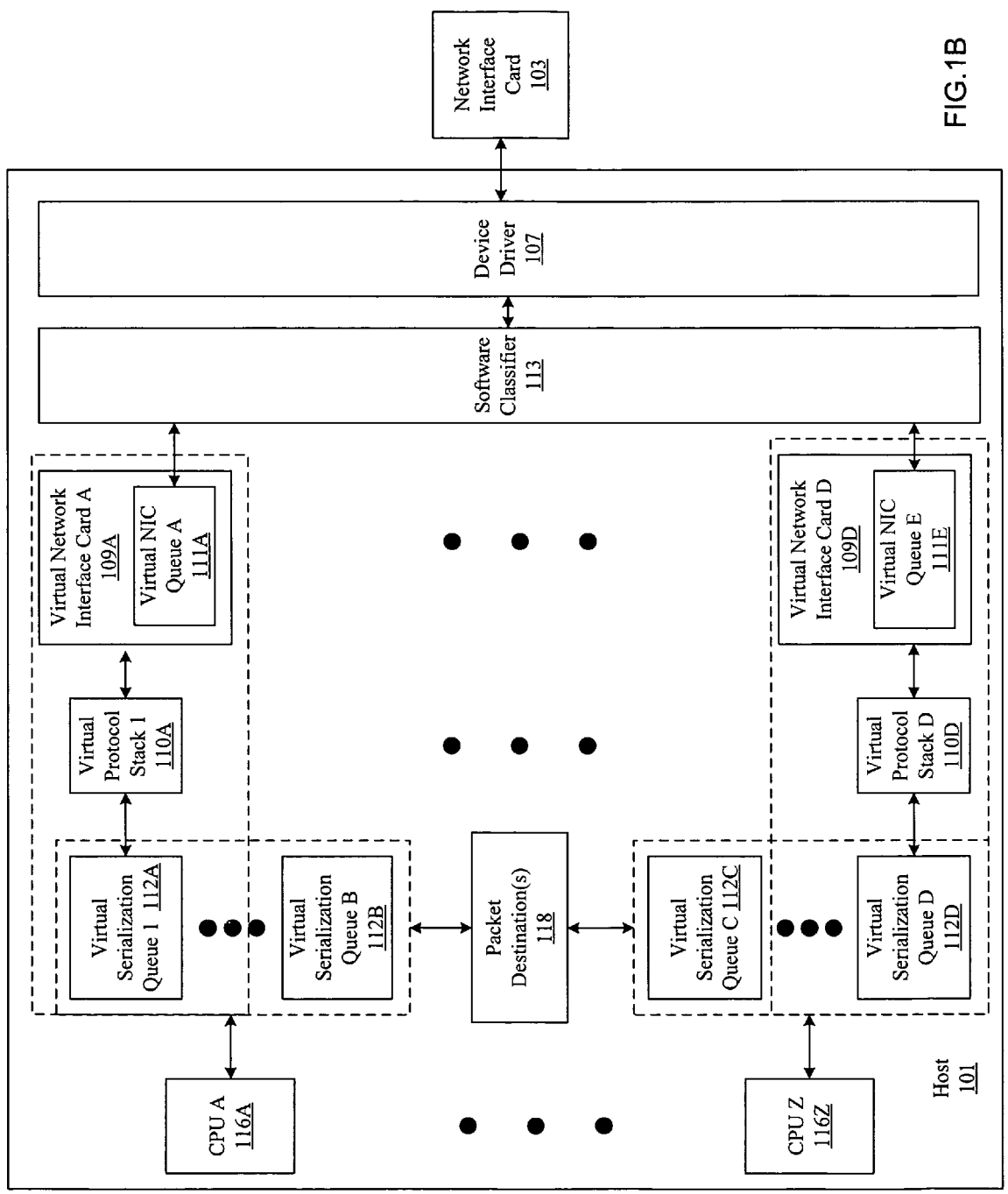

FIG. 1B shows a system in accordance with another embodiment of the invention. As shown in FIG. 1B, the system includes a host (101) operatively connected to a NIC (103). The NIC (103) provides an interface between the host (101) and a network (not shown) (e.g., a local area network, a wide area network, a wireless network, etc.). More specifically, the NIC (102) includes a Network Interface (NI) (i.e., the hardware on the NIC used to interface with the network). For example, the NI may correspond to an RJ-45 connector, a wireless antenna, etc. The packets received by the NI are then forwarded to other components on the NIC (103) for processing, etc.

In one embodiment of the invention, the host (101) may include the following components: a device driver (107), a software classifier (113), one or more virtual NICs (109A, 109D), one or more virtual protocol stacks (110A, 110D), one or more virtual serialization queues (112A, 112B, 112C, 112D), one or more CPUs (116A, 116Z), and one or more packet destination (118). In one embodiment of the invention, the software classifier (113) is configured to analyze the incoming network traffic, typically in the form of packets, received from the network (not shown).

In one embodiment of the invention, the purpose of classifying the packets is to determine to which of the virtual NIC queues (111A, 111D) each of the packets is forwarded. In one embodiment of the invention, the virtual NIC queues (111A, 111D) correspond to portions of memory (e.g., buffers) within the host (101) used to temporarily store packets. In one embodiment of the invention, analyzing the packets by the software classifier (113) includes analyzing one or more fields in the packet to determine to which of the virtual NIC queues (111A, 111D) each of the packets is forwarded. As an alternative, the software classifier (113) may use the contents of one or more fields in each packet as an index into a data structure that includes information necessary to determine which virtual NIC queue (111A, 111D) each of the packets is forwarded. In one embodiment of the invention, the software classifier (113) is able to arbitrarily move connections to any temporary data structure (i.e., receive ring (106A, 106D)) based on the fields in each packet. In one embodiment of the invention, the software classifier (113) is capable of being dynamically programmed to forward packets coming from an identified denial of service attack to a particular temporary data structure, such as receive ring (106A, 106D)

Continuing with FIG. 1B, the device driver (107) is operatively connected to the software classifier (113) and provides an interface between the NIC (103) and the host (101). In one embodiment of the invention, each of the virtual NICs (109A, 109D) includes one or more virtual NIC queues (111A, 111D). The virtual NICs (109A, 109D) provide an abstraction layer between the NIC (103) and the various packet destination (118) executing on the host (101). More specifically, each virtual NIC (109A, 109D) operates like a NIC (101). For example, in one embodiment of the invention, each virtual NIC (109A, 109D) is associated with one or more IP addresses, one or more ports, and configured to handle one or more protocol types of the attacking host. Thus, while the host (101) may be operatively connected to a single NIC (103), the host (101) (or more specifically, packet destinations (118) executing on the host (101)) operate as if the host (101) is bound to multiple NICs.

Each of the virtual NICs (109A, 109D) is operatively connected to a corresponding virtual protocol stack (110A, 110D). In one embodiment of the invention, each virtual protocol stack (110A, 110D) includes functionality to process packets in accordance with various protocols used to send and receive packets (e.g., TCP, IP, UDP, etc.). Further, each virtual protocol stack (110A, 110D) may also include functionality, as needed, to perform additional processing on the incoming and outgoing packets. This additional processing may include, but is not limited to, cryptographic processing, firewall routing, etc.

In one embodiment of the invention, each virtual protocol stack (110A, 110D) includes network layer and transport layer functionality. In one embodiment of the invention, network layer functionality corresponds to functionality to manage packet addressing and delivery on a network (e.g., functionality to support ARP, Internet Control Message Protocol, etc.). In one embodiment of the invention, transport layer functionality corresponds to functionality to manage the transfer of packets on the network (e.g., functionality to support TCP, UDP, SCTP, etc.).

In one embodiment of the invention, each virtual protocol stack (e.g., Virtual Protocol Stack A (110A), Virtual Protocol Stack D (110D)) is associated with a virtual serialization queue (e.g., Virtual Serialization Queue A (112A), Virtual Serialization Queue A (112D), respectively). In one embodiment of the invention, each virtual serialization queue (112A, 112B, 112C, 112D) corresponds to a data structure having at least two queues, an inbound queue and an outbound queue. Each of the queues within the virtual serialization queues (112A, 112B, 112C, 112D) are typically implemented as first-in first-out (FIFO) queues. Further, each virtual serialization queue (112A, 112B, 112C, 112D) is configured to send and receive packets from associated virtual NICs (109A, 109D) via an associated virtual protocol stack (110A, 110D). In addition, each virtual serialization queue (112A, 112B, 112C, 112D) is configured to send and receive packets from one or more associated packet destinations (118).

The structure of the virtual serialization queue (112A, 112B, 112C, 112D) is discussed below in detail and shown in FIG. 3. As discussed above, the host (101) may include one or more CPUs (116A, 116Z). Further, each virtual serialization queue (112A, 112B, 112C, 112D) is bound to one of the CPUs (116A, 116Z). As shown in FIG. 1B, a pair of virtual serialization queues (e.g., Virtual Serialization Queue A (112A) and Virtual Serialization Queue B (112B)) is bound to one CPU (e.g., CPU A (116A)). Although FIG. 1 shows a pair of virtual serialization queues bound to a single CPU, those skilled in the art will appreciate that any number of virtual serialization queues may be bound to a CPU.

As discussed above, in FIGS. 1 and 2, the host (100, 101) includes one or more packet destinations (118). In one or more embodiments of the invention, each packet destinations (118) provides an isolated environment for running applications. Processes running in a given container are prevented from monitoring or interfering with other activities in the system. Access to other processes, network interfaces, file systems, devices, and inter-process communication facilities is restricted to prevent interaction between processes in different container. The privileges available within a container are restricted to prevent operations with system-wide impact.

In one embodiment of the invention, each packet destination (118) may include functionality to support the following processes: per-container console, system log, packaging database, run level, identity (including name services), inter-process communication facility, etc. In addition, the host (100, 101) may include a set of administrative tools to manage the packet destination (118), allowing them to be configured, installed, patched, upgraded, booted, rebooted, and halted. As a result, packet destination (118) may be administered in a manner very similar to separate machines.

In one embodiment of the invention, a packet destination (118) may either be bound to a dedicated pool of resources (such as a number of CPUs, a quantity of physical memory, network resources), or can share resources with other packet destinations (118) according to defined proportions. This allows the use of container both on large systems (where dedicated resources may be most appropriate) and smaller ones (where a greater degree of sharing is necessary). Further, packet destination (118) also provide for the delegation of many of the expected administrative controls for using packet destinations (118). For example, because each container has its own name service identity, it also has its own notion of a password file and its own root user.

Figure 2:
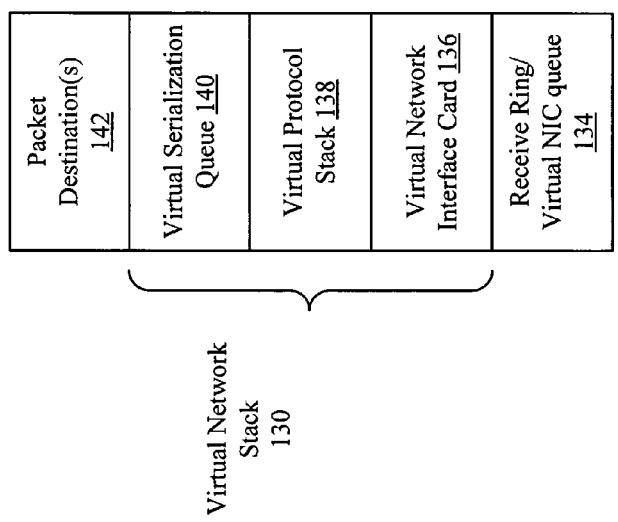
FIG. 2 shows a virtual network stack in accordance with one embodiment of the invention.

Continuing with the discussion of embodiments of the invention, in one embodiment of the invention, the receive rings and the virtual NIC queues may be generally referred to as temporary data structures. Further, in one embodiment of the invention, a system, as shown in FIGS. 1 and 2, may include multiple hosts (such as host (100) in FIG. 1 and host (101) in FIG. 2) where each host is operatively connected to one or more NICs. In one embodiment of the invention, each of the NICs may correspond to the NIC shown in FIG. 1 (i.e., NIC (102)) or the NIC shown in FIG. 1B (i.e., NIC (103)). Thus, in a given system, one host may include a software classifier (113) while another host may be connected to a NIC with a hardware classifier (104). In this scenario, the host (100, 101) would be configured to support both implementations, as described above with in FIGS. 1A and 1B.

FIG. 2 shows a virtual network stack in accordance with one embodiment of the invention. Various components described above in FIG. 1A and FIG. 1B may be collectively referred to as a virtual network stack (130). In one embodiment of the invention, the virtual network stack (130) includes a virtual NIC (136), a virtual protocol stack (138), and a virtual serialization queue (140). In one embodiment of the invention, the virtual network stack (130) may be bound to one or more receive rings or virtual NIC interfaces (134) (depending on the implementation). Further, the virtual network stack (130) may be bound to one or more packet destinations (142). All of the aforementioned components in the virtual network stack (130) are bound together such that a packet received by the virtual NIC (136) of a particular virtual network stack (130) is forwarded through the other components of the virtual network stack (130) until the packet reaches the packet destination (142)) associated with the particular virtual network stack (130). In one embodiment of the invention, the host includes multiple virtual network stacks (130) each of which includes a virtual NIC (136), a virtual protocol stack (138), and a virtual serialization queue (140).

Figure 3:
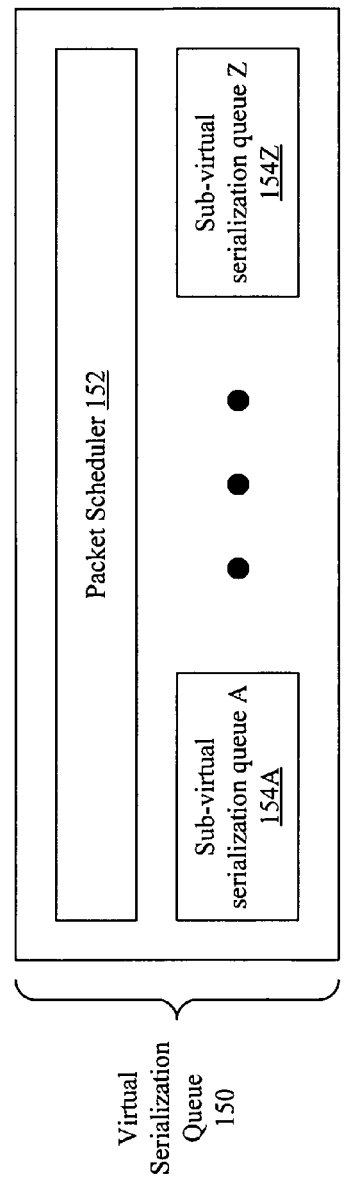
FIG. 3 shows a virtual serialization queue in accordance with one embodiment of the invention.

FIG. 3 shows a virtual serialization queue in accordance with one embodiment of the invention. In one embodiment of the invention, the virtual serialization queue (150) includes a packet scheduler (152) and one or more sub-virtual serialization queues (154A, 154Z). In one embodiment of the invention, each sub-virtual serialization queue (154A, 154Z) may be configured to queue specific types of packets. For example, the sub-virtual serialization queues (154A, 154Z) may be configured to queue received packets based on the protocol (e.g., IP Security Protocol (IPsec), TCP, IP, UDP, etc.) used to send the packet. Those skilled in the art will appreciate that each sub-virtual serialization queue (154A, 154Z) may be configured to queue any specified subset of packets. In one embodiment of the invention, if the virtual serialization queue (150) includes one or more sub-virtual serialization queues (154A, 154Z), then each of the sub-virtual serialization queues (154A, 154Z) is bound to the same CPU and associated with the same virtual network stack. Further, if the virtual serialization queue (150) includes one or more sub-virtual serialization queues (154A, 154Z), then the virtual network stack associated with the sub-virtual serialization queues (154A, 154Z) is also associated with a corresponding number of receive rings and/or virtual NIC queues (depending on the implementation). Thus, each of the sub-virtual serialization queues (154A, 154Z) is bound to one of the aforementioned receive rings and/or virtual NIC queues (depending on the implementation). Thus, when the virtual serialization queue (150) receives packets from one or more associated receive rings or a virtual NIC queues (not shown) (depending on the implementation) via the associated virtual network stack, the virtual serialization queue (150) places the packets in the appropriate sub-virtual serialization queue (154A, 154Z) based on which receive ring or virtual NIC queue the packets were received from. In one embodiment of the invention, the packets are placed on a sub-virtual serialization queue (154A, 154Z). In one embodiment of the invention, each of the sub-virtual serialization queues (154A, 154Z) includes a pair of FIFO queues, namely an inbound queue and an outbound queue.

Those skilled in the art will appreciate that a virtual serialization queue (150) does not necessarily include any sub-virtual serialization queues (154A, 154Z). If the virtual serialization queue (150) does not include any sub-virtual serialization queues (154A, 154Z), then the virtual serialization queue (150) may include only a single pair of queues.

In one embodiment of the invention, the packet scheduler (152) is configured to process the packets stored in each of the sub-virtual serialization queues (154A, 154Z). More specifically, the packet scheduler (152) schedules how packets queued in the various sub-virtual serialization queues (154A, 154Z) are to be processed (i.e., the order of processing of those packets, etc.). In one embodiment of the invention, the packet scheduler (150) may include functionality to support both fair-share scheduling and time-sharing scheduling with respect to processing of the packets queued on the sub-virtual serialization queues (154A, 154Z). Further, the packet scheduler (150) may also be configured to schedule packet processing based on the priority associated with each of the sub-virtual serialization queues (154A, 154Z). In one embodiment of the invention, the priority level of a particular sub-virtual serialization queue (e.g., 154A, 154Z) is based on an attack control parameter, which is based on the severity of the denial of service attack.

Figure 4:
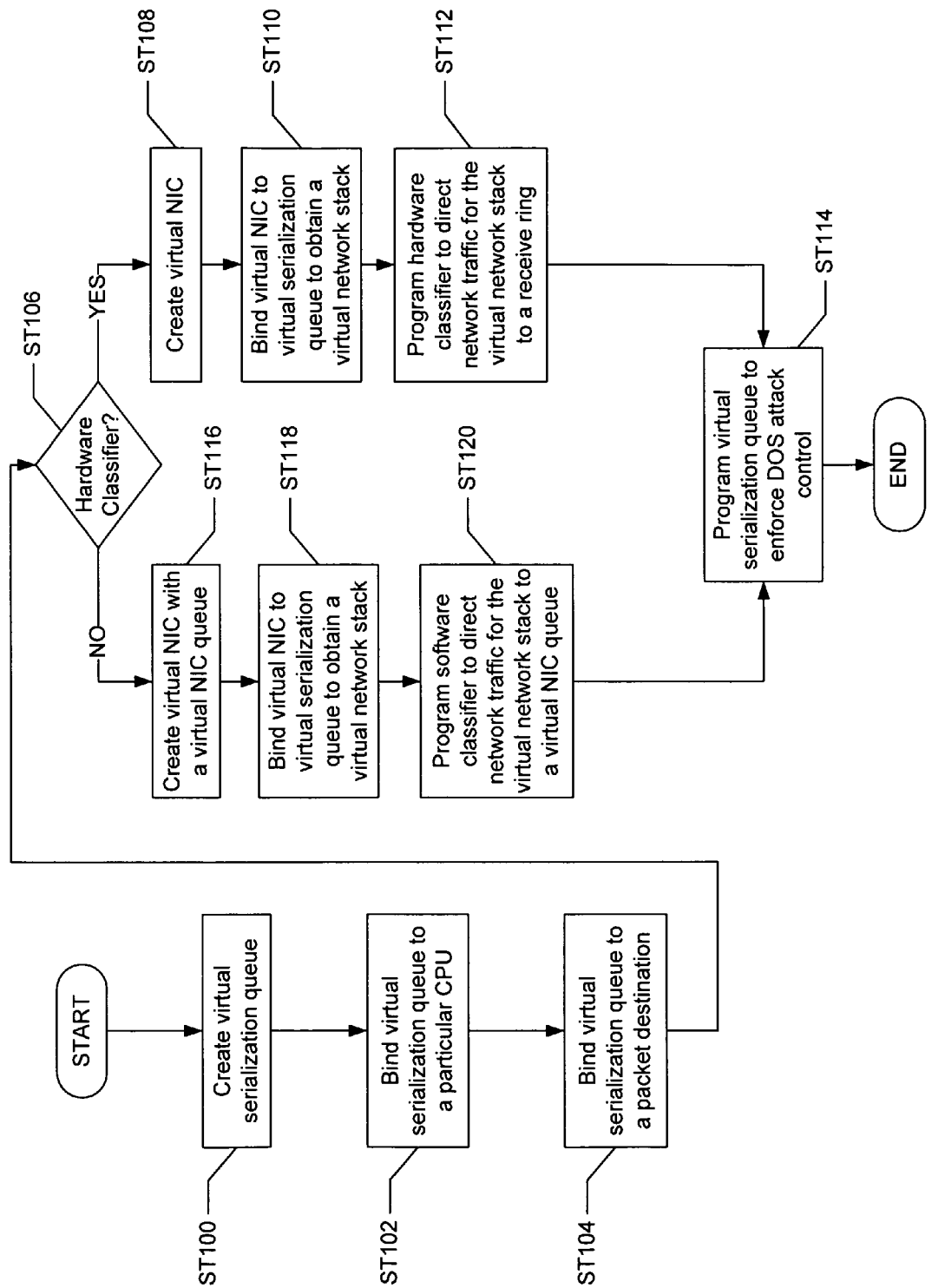
FIGS. 4 and 5 show flowcharts in accordance with one embodiment of the invention.

FIG. 4 shows a flowchart in accordance with one embodiment of the invention. Initially, a virtual serialization queue is created (ST100). In one embodiment of the invention, creating the virtual serialization queue may include specifying one or more sub-virtual serialization queues and configuring the packet scheduler. The virtual serialization queue is subsequently bound to a CPU on the host (ST102). Those skilled in the art will appreciate that the virtual serialization queue created in ST100 may be implicitly bound to a CPU upon creation.

At this stage, the virtual serialization queue is bound to a packet destination (ST104). Those of ordinary skill in the art will appreciate that the packet destination (118) may be bound to the virtual serialization queue any time after the virtual serialization queue has been created.

A determination is now made whether a NIC associated with the host includes a hardware classifier (ST106). If the NIC includes a hardware classifier, then a virtual NIC is created (ST108) and bound to the virtual serialization queue created in ST100 to obtain a virtual network stack (ST110). The hardware classifier is subsequently programmed so that network traffic for the virtual network stack created in ST110 is directed to a particular receive ring by the hardware classifier (ST112). In one embodiment of the invention, the hardware classifier is programmed so that the network traffic is directed to a particular virtual NIC queue.

The virtual serialization queue created in ST100 is programmed to enforce DOS attack control (ST114). In one embodiment of the invention, ST114 is optional. In one embodiment of the invention, programming the virtual serialization to enforce DOS attack control includes specifying an attack control parameter for the virtual serialization queue. In one embodiment of the invention, the attack control parameter specifies the maximum number of packets that may be processed by the virtual serialization queue over a specific time period (e.g., number of packets that may be processed by the specific virtual serialization queue per second). Alternatively, the attack control parameter may specify the maximum number of bytes of data that may be processed by the virtual serialization queue in a specific time period.

Continuing the discussion of FIG. 4, if the NIC does not include a hardware classifier (i.e., the scenario in which the host includes a NIC having a software classifier), then a virtual NIC with a virtual NIC queue is created (ST116) and bound to the virtual serialization queue created in ST100 to obtain a virtual network stack (ST118). The software classifier is then programmed so that network traffic for the virtual network stack created in ST110 is directed to a particular virtual NIC queue by the software classifier (ST120). In one embodiment of the invention, the software classifier is modified to direct the network traffic is to a particular virtual NIC queue associated with a severity level of the denial of service attack by an attacking host. The method then proceeds to ST114.

Those skilled in the art will appreciate that the steps shown in FIG. 4 may be repeated as required to create any number of virtual network stacks. Once the virtual network stack(s) has been created, as described above, the host may proceed to receive packets from the network. Those skilled in the art will appreciate that the number of virtual network stacks created using the steps shown in FIG. 4 may vary based on the available system resources (e.g., number of CPUs, type of NIC, etc.)

Figure 5:
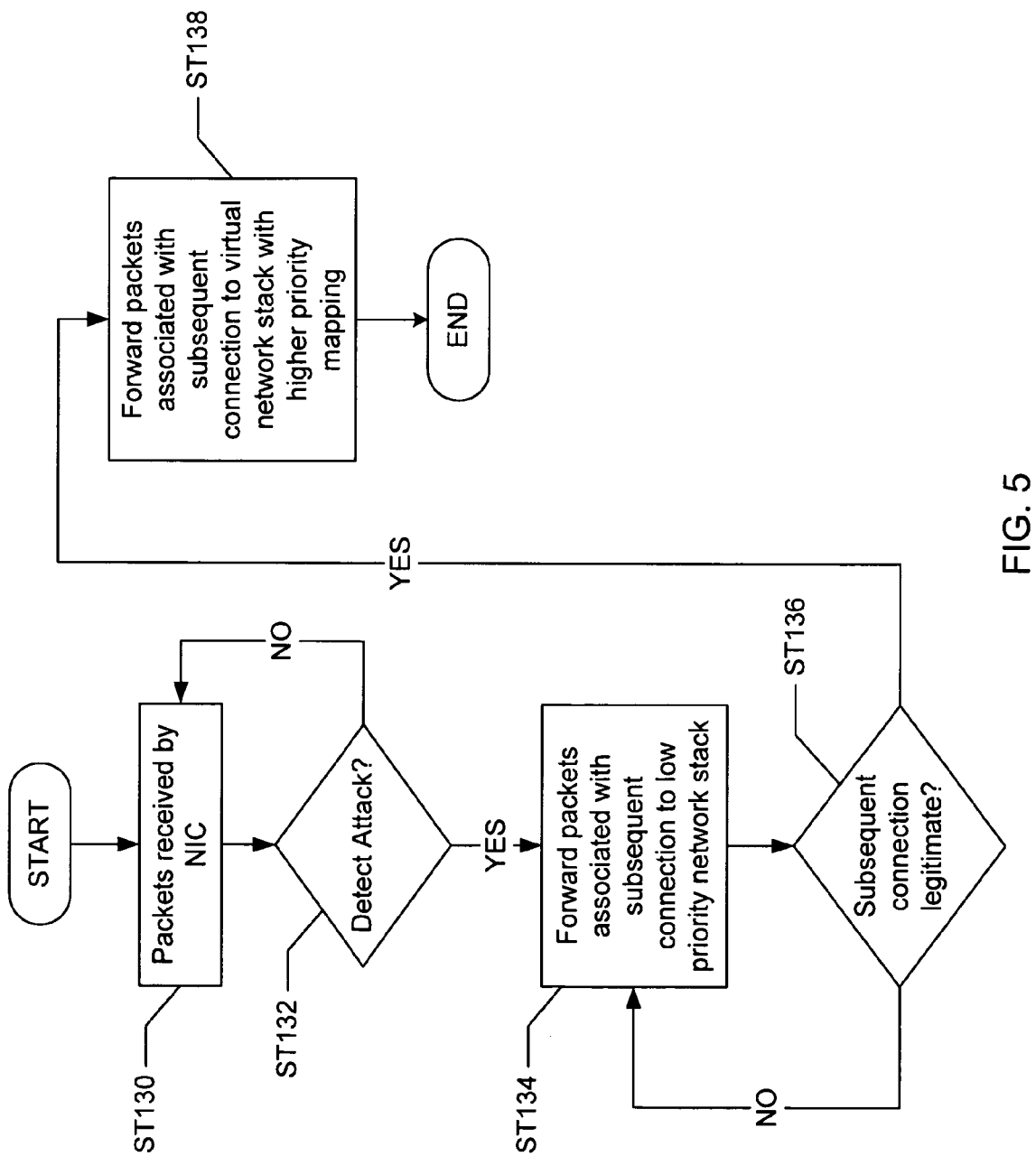

FIG. 5 shows a flowchart in accordance with one embodiment of the invention. Initially, one or more packets are received by the NIC (ST130). Next, the stack detects whether a denial of service attack or an extreme (i.e., exceptionally heavy) network load exists (ST132). In one embodiment of the invention, an extreme network load is determined by comparing the total capability of the network stack and comparing it current load. If the current load exceeds a predetermined threshold (e.g., 95% of total capacity used, 15% of capacity remaining, etc.), then the network load is deemed as extreme.

If an attack is not detected, then packets continue to be received. If an attack is detected, then packets associated with a subsequent (i.e., new) connection is forwarded to a network stack with a low priority (ST136). In one embodiment of the invention, the connections are assigned to lowest priority queues by dynamically programming the classifier at the connection setup time. As a result of this designation as lowest priority, the connections cannot overwhelm the system and consume only finite (and predetermined) amount of bandwidth and CPU resources.

At ST136, a determination is made whether a subsequent connection is legitimate. The subsequent connection is deemed legitimate when user level authentication is complete or a user moves beyond the initial stages of the connection. For example, if a user of a website accesses a website and then clicks on several links on the website or access other portions of the website, then the connection to the website is deemed to be legitimate and not a denial of service attack. Similarly, if a user completes certain information on a website and is authenticated for the purposes of that website, then the connection is deemed legitimate. To the contrary, if a single home page of a website is accessed repeatedly or authentication attempts are unsuccessful, the connection is not considered legitimate.

One skilled in the art will appreciate that if a backend application associated with the connection requires authentication, then the connection is most likely legitimate once authentication is successful. If the subsequent connection is not deemed legitimate (ST136), then the packets associated with the connection continue to be sent to the low priority network stack (ST134). On the other hand, if the subsequent connection is legitimate (ST136), then packets associated with subsequent connection are forwarded to virtual network stack with higher priority mapping (ST138). In one embodiment of the invention, the higher priority mapping allows genuine users to enjoy a better user experience even under denial of service attack. Specifically, the mapping allows packets associated with the subsequent connection to be classified so they are mapped to a temporary data structure associated with a virtual network stack having a higher priority.

Those skilled in the art will appreciate the virtual serialization queue may operate in polling mode without using an attack control parameter. Thus, if no attack control parameter is specified, then all packets for the particular virtual serialization queue are forwarded from the receive ring or virtual NIC queue to the virtual serialization queue each time the virtual serialization queue requests packets from the receive ring or virtual NIC queue. Those skilled in the art will appreciate that the receive rings and/or virtual NIC queues store a finite number of packets. Thus, if the receive rings and/or virtual NIC queues are receiving packets at a faster rate than the corresponding virtual serialization queue is requesting packets, the receive rings and/or virtual NIC queues fills with packets and packets received after this point are dropped until packets on the receive rings and/or virtual NIC queues are requested and processed.

Figure 6:
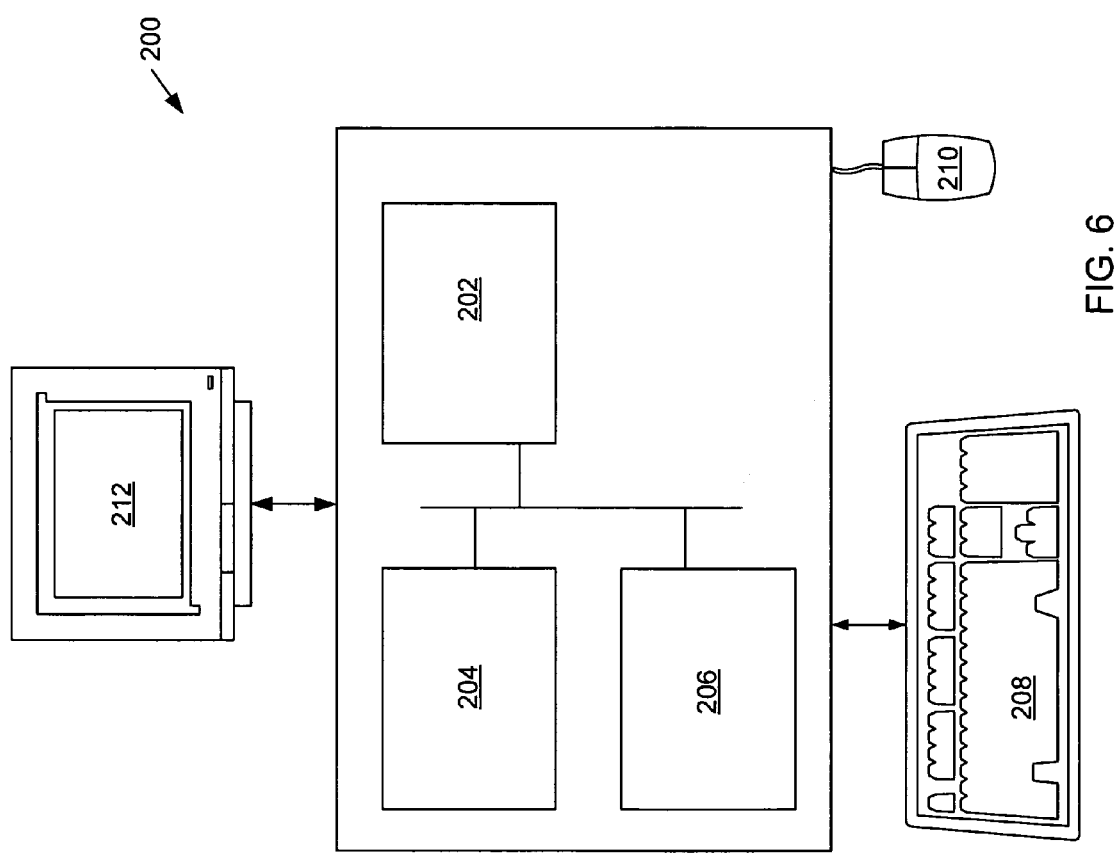
FIG. 6 shows a computer system in accordance with one embodiment of the invention.

An embodiment of the invention may be implemented on virtually any type of computer regardless of the platform being used. For example, as shown in FIG. 6, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be remotely located and connected to the other elements over a network. Further, software instructions to perform embodiments of the invention may be stored on a computer readable medium such as a compact disc (CD), a diskette, a tape, a file, or any other computer readable storage device.

In one embodiment of the invention, service providers can ensure that genuine users enjoy a better user experience even under denial of service attack. Further, in one embodiment of the invention, non-critical network traffic is easily identified and assigned lower priority and resources.

While the invention has been described with respect to a limited number of embodiments, those skilled in the art, having benefit of this disclosure, will appreciate that other embodiments and advantages can be devised which do not depart from the scope of the invention as disclosed herein. Accordingly, the scope of the invention should be limited only by the attached claims.

What is claimed is:

1. A method for isolating legitimate network traffic during a denial of service attack comprising:
    receiving a plurality of packets from a network;
    detecting a denial of service attack from the network on a first virtual network stack;
    in response to detecting the attack from the network:
        forwarding a plurality of packets associated with a subsequent connection to a temporary data structure associated with a second virtual network stack, wherein the temporary data structure associated with the second virtual network stack is a lowest priority queue configured at a setup time of the subsequent connection;
        determining whether the subsequent connection is legitimate; and
        forwarding at least one of the plurality of packets associated with the subsequent connection to a temporary data structure associated with the first virtual network stack if the subsequent connection is legitimate, wherein a higher priority mapping is assigned to the subsequent connection by a classifier, and wherein the first virtual network stack and the second virtual network stack are executing in a single host.

2. The method of claim 1, further comprising:
    requesting a number of packets from the temporary data structure associated with the first virtual network stack by a virtual serialization queue, wherein the virtual serialization queue is associated with the first virtual network stack; and
    forwarding the number of packets to the virtual serialization queue.

3. The method of claim 2, wherein the number of packets is limited by an attack control parameter associated with the virtual serialization queue.

4. The method of claim 3, wherein the attack control parameter specifies a maximum number of packets that may be retrieved from one of a plurality of temporary data structures associated with the virtual serialization queue in a specified period of time.

5. The method of claim 3, wherein the attack control parameter specifies a maximum number of bytes that may be retrieved from one of a plurality of temporary data structures associated with the virtual serialization queue in a specified period of time.

6. The method of claim 1, wherein the subsequent connection is legitimate upon authentication of the subsequent connection.

7. The method of claim 1, wherein the subsequent connection is legitimate once a user proceeds beyond an initial stage of the subsequent connection.

8. The method of claim 1, further comprising:
    creating the first virtual network stack prior to receiving the plurality of packets from the network.

9. The method of claim 8, wherein creating the first virtual network stack comprises:
    creating the virtual serialization queue;
    binding the virtual serialization queue to a central processing unit;
    binding the virtual serialization queue to a packet destination;
    creating a virtual network interface card (NIC);
    binding the virtual serialization queue to the virtual NIC and a virtual protocol stack to obtain the first virtual network stack.

10. The method of claim 9, wherein the packet destination is at least one selected from a group consisting of a container and a service.

11. The method of claim 1, wherein the temporary data structure associated with the first virtual network stack and the temporary data structure associated with the second virtual network stack each comprise one selected from a group consisting of a virtual network interface card queue and a receive ring.

12. The method of claim 1, wherein the classifier is one selected from a group consisting of a hardware classifier and a software classifier.

13. A system for isolating legitimate network traffic during a denial of service attack, comprising:
    a network interface configured to receive a plurality of packets from a network;
    a classifier operatively connected to the network interface, the classifier configured to be dynamically programmed by an Internet Protocol (IP) stack to send the plurality of packets associated with a connection and determine to which of a plurality of temporary data structures each of the plurality of packets is forwarded,
    wherein the IP stack includes instructions to:
        detect a denial of service attack from the network on a first virtual network stack;
        in response to detecting the attack from the network:
            forward a plurality of packets associated with a subsequent connection to a temporary data structure associated with a second virtual network stack, wherein the temporary data structure associated with the second virtual network stack is a lowest priority queue configured at a setup time of the subsequent connection and is included in the plurality of temporary data structures;

determine whether the subsequent connection is legitimate; and forward at least one of the plurality of packets associated with the subsequent connection to a temporary data structure associated with the first virtual network stack if the subsequent connection is legitimate, wherein a higher priority mapping is assigned to the subsequent connection by the classifier, wherein the temporary data structure associated with the first virtual network stack is included in the plurality of temporary data structures, and wherein the first virtual network stack and the second virtual network stack are executing in a single host.

14. The system of claim 13, wherein the plurality of temporary data structures is configured to receive each of the plurality of packets, wherein one of the plurality of temporary data structures is associated with at least one virtual serialization queue.

15. The system of claim 14, wherein the at least one virtual serialization queue is configured to retrieve and queue a number of packets from the one of the plurality of temporary data structures.

16. The system of claim 15, wherein the at least one virtual serialization queue is associated with a packet destination.

17. The system of claim 16, wherein the packet destination is at least one selected from a group consisting of a container and a service.

18. The system of claim 15, wherein the at least one virtual serialization queue is associated with a virtual network stack.

19. The system of claim 18, wherein the virtual network stack comprises a virtual network interface card, a virtual protocol stack, and the at least one virtual serialization queue.

20. The system of claim 15, wherein the number of packets is limited by an attack control parameter associated with the at least one virtual serialization queue.

21. The system of claim 20, the attack control parameter specifies a maximum number of packets that may be retrieved from the one of the plurality of temporary data structures associated with the at least one virtual serialization queue in a specified period of time.

22. The system of claim 20, wherein the attack control parameter specifies a maximum number of bytes that may be retrieved from the one of the plurality of temporary data structures associated with the at least one virtual serialization queue in a specified period of time.

23. The system of claim 14, wherein each of the plurality of temporary data structures comprises at least one selected from a group consisting of a virtual network interface card queue and a receive ring.

24. The system of claim 13, wherein the classifier is one selected from a group consisting of a hardware classifier and a software classifier.

* * * * *

UNITED STATES PATENT AND TRADEMARK OFFICE
CERTIFICATE OF CORRECTION

PATENT NO. : 7,627,899 B1  Page 1 of 1
APPLICATION NO. : 11/112629
DATED : December 1, 2009
INVENTOR(S) : Tripathi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1258 days.

Signed and Sealed this

Second Day of November, 2010

David J. Kappos
*Director of the United States Patent and Trademark Office*